(12) United States Patent
Whan

(10) Patent No.: US 10,502,010 B2
(45) Date of Patent: Dec. 10, 2019

(54) VACUUM ASSISTED AERATED DRILLING

(71) Applicant: Wen J Whan, West Covina, CA (US)

(72) Inventor: Wen J Whan, West Covina, CA (US)

( * ) Notice: Subject to any disclaimer, the term of this patent is extended or adjusted under 35 U.S.C. 154(b) by 142 days.

(21) Appl. No.: 15/457,228

(22) Filed: Mar. 13, 2017

(65) Prior Publication Data
US 2018/0258720 A1 Sep. 13, 2018

(51) Int. Cl.
*E21B 21/06* (2006.01)
*B01D 21/26* (2006.01)

(52) U.S. Cl.
CPC .......... *E21B 21/065* (2013.01); *B01D 21/265* (2013.01)

(58) Field of Classification Search
CPC .. E21B 21/065; E21B 21/00; E21B 2021/005; E21B 21/06; E21B 21/08; E21B 2021/007; E21B 21/01; B01D 21/265
See application file for complete search history.

(56) References Cited

U.S. PATENT DOCUMENTS

| | | | |
|---|---|---|---|
| 2,818,230 A | 12/1957 | Davis | |
| 2,828,107 A | 3/1958 | Bobo | |
| 2,852,091 A | 9/1958 | Boudreaux et al. | |
| 2,880,965 A | 4/1959 | Bobo | |
| 2,920,872 A | 1/1960 | Baur et al. | |
| 2,984,309 A | 5/1961 | Welchon | |
| 2,995,515 A | 8/1961 | Bobo | |
| 2,999,551 A | 9/1961 | Murphy | |
| 3,149,684 A | 9/1964 | Eckel et al. | |
| 3,150,085 A | 9/1964 | Mallory | |
| 3,259,189 A | 7/1966 | Darley | |
| 3,269,468 A | 8/1966 | Phansalkar et al. | |
| 3,297,098 A | 1/1967 | Elman et al. | |
| 3,334,691 A | 8/1967 | Parker | |
| 3,497,020 A * | 2/1970 | Kammerer, Jr. | E21B 17/10 175/212 |
| 3,534,822 A * | 10/1970 | Campbell | E21B 21/12 175/205 |
| 3,664,444 A | 5/1972 | Henson | |
| 3,899,033 A | 8/1975 | Huisen | |
| 3,958,651 A | 5/1976 | Young | |
| 4,088,583 A | 5/1978 | Pyle et al. | |
| 5,249,635 A * | 10/1993 | King | E21B 21/14 175/48 |
| 6,530,772 B1 | 3/2003 | Gregg | |
| 7,055,627 B2 | 6/2006 | Fontana et al. | |
| 7,073,612 B2 | 7/2006 | Finchum | |
| 7,237,623 B2 | 7/2007 | Hannegan | |
| 7,503,409 B2 | 3/2009 | Brookover | |
| 8,347,983 B2 | 1/2013 | Hoyer et al. | |
| 9,493,986 B2 * | 11/2016 | Jeffryes | E21B 21/12 |

(Continued)

*Primary Examiner* — Michael R Wills, III
(74) *Attorney, Agent, or Firm* — Muncy, Geissler, Olds & Lowe, P.C.

(57) ABSTRACT

A system and methods of using air compressors to create a jet vacuum to accelerate the drilling fluid circulation, which is located on the surface, or down the hole through passages along the well casings or drilling pipes. The jet vacuum is applied to help suck up the drilling fluids with cuttings. They are used in addition to the pumps and boosters to push and circulate the drilling mud or aerated-compound fluid. The invention accelerates the drilling fluid circulation and reduces the number of pumps and boosters.

8 Claims, 4 Drawing Sheets

(56) References Cited

U.S. PATENT DOCUMENTS

| | | | |
|---|---|---|---|
| 2004/0104030 A1* | 6/2004 | Livingstone | E21B 21/08 |
| | | | 166/312 |
| 2005/0263326 A1 | 12/2005 | Finchum | |
| 2007/0129257 A1 | 6/2007 | Kippie et al. | |
| 2009/0145664 A1* | 6/2009 | Larson | E21B 21/063 |
| | | | 175/65 |
| 2011/0272139 A1 | 11/2011 | Van Den Brekel et al. | |
| 2016/0010407 A1* | 1/2016 | McCraw | E21B 21/01 |
| | | | 175/17 |

* cited by examiner

VACUUM ASSISTED AERATED DRILLING

FIELD OF THE INVENTION

The present invention discloses a vacuum assisted aerated drilling, and more particularly, to a vacuum assisted aerated drilling system.

BACKGROUND OF THE INVENTION

For conventional deep well drillings, the drilling fluid is pumped downward through the drilling pipes or outside the pipes along the borehole annulus. The fluid is then circulated upward to the surface with cuttings along the borehole annulus or the drilling pipes.

The main functions of conventional drilling fluids are to provide hydrostatic pressure to prevent formation fluids from entering into the well bores, to keep the drill bits cool and clean during drilling process, to take out drill cuttings, and to suspend the drill cuttings while drilling is paused and when the drilling assembly is brought in and out of the hole. The drilling fluid used for a particular job is so selected as to avoid formation damage and to limit corrosion. Aerated drilling is widely used in geothermal drillings, especially for reservoirs which are mainly controlled by fractures. If the drilling mud creates higher borehole pressure than that at the fractures, it would cause a loss of circulation and might pollute the aquifer and block the geothermal reservoirs.

One key aspect of the deep well drilling technology is how to keep the drilling fluids in a borehole circulating fast enough to create a fluid or air curtain on the borehole annulus. This could prevent the fluid or contaminants from moving from the formation to the borehole and the other way around. Pumps and boosters on the earth surface or down the borehole are used to create the drilling fluid circulation.

Patents related to aerated-drilling technique had been disclosed as early as six decades ago. U.S. Pat. No. 2,818,230 published on Dec. 31, 1957 by E. E. Davis disclosed the method comprising the steps of flowing into a well borehole a stream of drilling fluid containing finely divided solid to establish for said borehole a fluid column having a hydrostatic head in excess of any formation pressures encountered in said borehole, injecting compressed air into the drilling fluid at the surface, and circulating the resultant aerated drilling fluid in the well in contact with the face of a permeable formation into which drilling fluid is being lost. U.S. Pat. No. 2,828,107 published on Mar. 25, 1958 by R. A. Bobo disclosed an improved process and apparatus for rotary drilling with aerated drilling fluid, to provide a method and apparatus for use in rotary drilling which reduces the time required to replace an aerated drilling fluid in the drill string and wellbore annulus with non-aerated drilling fluid, and for reducing the lost time in rotary drilling when the fluid in the drill string and borehole is changed from an aerated type to a non-aerated one. U.S. Pat. No. 2,880,965 published on April, 1959 by R. A. Bobo disclosed a method and means for rotary well drilling utilizing an aerated drilling fluid such as aerated drilling mud, a method and means for preventing or minimizing overflow or self-unloading of an aerated drilling fluid from the upper end of the drilling string when joints are added to the string, and a method of changing the pressure drop across the drill bit when the non-aerated drilling fluid is changed to be an aerated, less dense, and less viscous fluid without pulling the bit. U.S. Pat. No. 2,852,091 published on September, 1958 by Boudreaux ET AL disclosed means for separating gasses from liquid and solids in drilling fluids containing the same. U.S. Pat. No. 2,920,872A published on Jan. 12, 1961 by Baur George W, etc. disclosed the drilling of earth bores by the rotary method of drilling and more particularly the drilling in which the flushing fluid is a gaseous medium pumped downwardly through the drill string and thence outwardly through the flushing fluid passageways in the drill bit and upwardly in the annulus about the drill string to remove cuttings from the bore as drilling advances. U.S. Pat. No. 2,984,309 published on May 16, 1961, by J. K. Welchon disclosed a turbine engine close to the drilling bit powered by the hydraulic horsepower in the drilling fluid to increase the drilling efficiency. It involves aerating the fluid mud exhausted from the turbodrill. U.S. Pat. No. 2,995,515 published on Aug. 8, 1961, by R. A. Bobo disclosed an improved method for drilling with an aerated drilling fluid. It relates to a method of improving rotary drilling employing an aerated drilling fluid by including in the drilling fluid a small amount of material or collecting agent which promotes adherence of froth or air bubbles to the cuttings formed during drilling process. U.S. Pat. No. 2,999,551A published on Sep. 12, 1961 by Murphy Jr Robert P disclosed the use of a gaseous drilling fluid in the rotary drilling of oil, gas and water wells. U.S. Pat. No. 3,149,684A published on Sep. 22, 1964 by Eckel John E, etc. disclosed an improved method of drilling earth boreholes by rotary drilling, wherein a gas rather than a liquid is employed as the circulation medium for carrying particles of dislodged earth to the surface. More specifically, it is concerned with -tions and also improves the productivity of a completed well. U.S. Pat. No. 3,150,085 published on Sep. 22, 1964 by Harvey E. Mallory disclosed a method of drilling a well through a subsurface formation employing an oil-in-water emulsion drilling fluid. U.S. Pat. No. 3,259,189A published on Jul. 5, 1966, by Darley Henry C H disclosed a method of preventing shales from caving into gas-filled boreholes. More particularly, it is directed to preventing shales from caving into a borehole during the drilling thereof with a gaseous circulating fluid. In the latter respect, it is proven particularly effective to protect shales from the action of water encountered during gas drilling operations. U.S. Pat. No. 3,269,468A published on Aug. 30, 1966, by Brown Jack L, etc. disclosed the use of foaming agents for removing subterranean liquids from wellbores, underground hydrocarbon storage facilities and the like. More particularly, it is related to the provision of improved foaming agents for use in removing encroaching formation fluids from the wellbore of an oil or gas well which is being drilled utilizing a compressed gas as the drilling fluid. U.S. Pat. No. 3,297,098 published on Jan. 10, 1967 by Standley H. Elman, etc. disclosed a process for aerated drilling in subsurface boreholes, and more particularly disclosed the improvement of the aerated drilling process by incorporation of chemical additives into aerated drilling fluid in order to produce improved foam for removal of cuttings from the well and for lubrication of the drilling tools. U.S. Pat. No. 3,334,691A published on Aug. 8, 1967, by Parker Harry W, disclosed an apparatus for preventing fluids from entering a wellbore. In one aspect, it relates to an apparatus for preventing the encroachment of fluids from a formation traversed by a wellbore during the drilling of said wellbore. In another aspect, it relates to an apparatus for rapidly and efficiently sealing a wellbore during the drilling of said wellbore so as to prevent fluids from entering the wellbore. U.S. Pat. No. 3,664,444A published on May 23, 1972, by Henson William P, disclosed an air drilling method using controlled split stream and involving a coupling for connecting adjacent sections of an earth boring hollow auger.

U.S. Pat. No. 3,899,033A published on Aug. 12, 1975, by Van Huisen Allen T, disclosed a drilling system, which relies on the weight and reciprocating movement of the drill column to provide actuation and rotation of the drill bit at the bottom of the bore hole. A pneumatic power source located immediately above the bit is driven by raising the suspended drill column by means of draw-works and releasing the column to convert the kinematic motion of the column into fluid power in the pneumatic power source. The compressed fluid enters a pneumatic chamber and causes rotation of the drill bit as it engages the sides and bottom of the bore hole. U.S. Pat. No. 3,958,651 published on May 25, 1976, by James Whitehurst Young, disclosed a rotary drilling bit ideally suitable for large diameter boreholes with a pressure and jet vacuum to remove the cuttings from the inner passage inside the drilling string. U.S. Pat. No. 4,088,583 published on May 9, 1978, by Delbert E. Pyle, etc., disclosed an improved foam drilling fluid composition and method of use thereof in drilling high-temperature subterranean reservoir. U.S. Pat. No. 6,530,772 published on Mar. 11, 2003, by Frederick Browne Gregg, disclosed a system for making aerated concrete block having at least one passageway drilled therein. None of the above-mentioned disclosures is related to the jet vacuum assistance along the borehole or surface in order to accelerate the drilling fluid circulation.

Recent patents related to aerated-drilling techniques are disclosed as followed. US Patent Publication 2005/0263326A1 published on Dec. 1, 2005, by Ray Finchum, disclosed a surge device providing a vent for bleeding pressure off an air drilled well and providing connectors for surge lines in the blooie line. The surge device has a hollow, abrasion resistant, tapered chamber into which two surge lines and the blowdown line enter the surge device. U.S. patent application Ser. No. 10/713,708 published on Jun. 6, 2006 by Peter Fontana, Roger Fincher etc., disclosed a drilling fluid system that supplies drilling fluid into an annulus (supply line) between the umbilical and the wellbore, which discharges at the drill bit bottom and returns to the wellhead through the umbilical (return line) carrying the drill cuttings. A fluid circulation device, such as a turbine or centrifugal pump, is operated in the return line to provide the primary motive force for circulating drilling fluid through a fluid circuit formed by the supply line and return line. Optionally, a secondary fluid circulation device in fluid communication with the return line can cooperate with the fluid circulation device to circulate drilling fluid and/or a near bit fluid circulation device can be used to provide localized flow control or suction pressure to improve bit cleaning U.S. Pat. No. 7,073,612B2 published on Jul. 11, 2006, by Ray A. Finchum, disclosed a surge device providing a vent for bleeding pressure off an air drilled well and providing connectors for surge lines in the blooie line. U.S. Pat. No. 7,237,623B2, published on Jul. 3, 2007, by Don Hannegan, disclosed a method for drilling in the floor of an ocean from a floating structure using a rotatable tubular includes a seal housing having a rotatable seal connected above a portion of a marine riser fixed to the floor of the ocean. US Patent Publication 2007/0129257A1, published on Jun. 7, 2007, by David Kippie, etc., disclosed a hydrocarbon drilling fluid system including a hydrocarbon fluid and a foaming composition, where the foaming composition includes a polymer, a gelling agent and its cross-linking agent, an optional foaming agent, or mixtures or combinations thereof. The use of this drilling fluid system in a variety of downhole applications is also disclosed. U.S. Pat. No. 7,503,409B2 published on Mar. 17, 2009, by Brian David Brookover, disclosed an earth drilling rig in which an air compressor and one or more hydraulic pumps are driven by the same engine, the intake throttle of the compressor is controlled by an electronic controller having a proportional integral derivative control. The controller minimizes unloading of the compressor, allowing the engine to operate more efficiently, the hydraulic system to provide more consistent power to drilling functions and the volume and pressure of compressed air to be optimized for the drilling conditions encountered. US Patent Publication 2011/0272139A1 published on Nov. 10, 2011 by Bernardus Johannes Henricus Van Den Brekel, disclosed a system for drilling a borehole into an earth formation, comprising a casing arranged in the borehole, a drill string extending through the interior of the casing to a lower end portion of the borehole, and a body of drilling fluid extending into the casing, the casing having an inner surface susceptible to wear due to frictional contact with an outer surface of the drill string during drilling of the borehole with the drill string. U.S. Pat. No. 8,347,983 published on Jan. 8, 2013 by Hoyer, et al, disclosed a Drill-To-The-Limit Method for drilling a wellbore in a formation with a fluid, comprising the steps of: casing a portion of the wellbore using a casing having a casing shoe; determining a casing shoe pressure; determining a formation fracture pressure in the formation; positioning a rotating control device with said casing; and drilling the wellbore at a fluid pressure calculated using the lesser of the casing shoe pressure or the formation fracture pressure. None of the above-mentioned disclosures is related to the jet vacuum assistance along the borehole or surface in order to accelerate the drilling fluid circulation.

SUMMARY OF THE INVENTION

An object of the present invention is to provide a jet vacuums method, where at least one air compressor is used to create a jet vacuum on the head of the borehole to accelerate the circulation in addition to that from the pumps and boosters.

Another object of the present invention is to provide a jet vacuum method, where the air is compressed to a certain depth of the borehole through a passage and then reverted in 180 degrees, so as to eject the air upward to accelerate the circulation in addition to that from the pumps and boosters.

Still another object of the present invention is to provide a method to separate the drilling cuttings from the drilling fluid, where the drilling fluid flows through a curved or straight pipe with collectors at difference distances from the ejector for different sizes of cuttings.

In order to achieve the objects, the present invention provides a vacuum-assisted aerated drilling system, comprises a casing, a pump, and at least one air compressor. The casing is used for housing the borehole. The pump is used for pumping a drilling fluid into a drilling string and out of a drilling bit near a bottom of the borehole. The at least one air compressor is used for creating a jet vacuum effect to suck the drilling fluid pumped out of the drilling bit near the bottom of the borehole from a head of the borehole.

In implementation, the vacuum-assisted aerated drilling system further comprises a circulation outlet pipe, and the at least one air compressor includes a first air compressor. The circulation outlet pipe is placed horizontally or tilted upward at the head of the borehole. The first air compressor is used for ejecting air into the circulation out pipe so as to create a jet vacuum effect to suck the drilling fluid out of the drilling bit together with cuttings produced by the drilling bit into the circulation outlet pipe.

In implementation, the vacuum-assisted aerated drilling system further comprises a separator. The separator is used to receive the sucked drilling fluid together with the cuttings and separate the cuttings from the drilling fluid. In one embodiment, the vacuum-assisted aerated drilling system further comprises a curved, spiral or straight separation pipe, wherein the drilling fluid together with the cuttings are drawn into the separator through the curved, spiral or straight separation pipe.

In implementation, the vacuum-assisted aerated drilling system further comprises a plurality of separators. The plurality of separators is used to receive the sucked drilling fluid together with the cuttings and separate the cuttings from the drilling fluid. Moreover, the plurality of separators is placed at different distances from the first air compressor, so as to collect the cuttings according to their weights and particle sizes.

In implementation, the at least one air compressor includes a second air compressor. The second air compressor is used for pushing a high pressured air into a passage that is extended firstly downward along the casing and then reverted in 180 degrees upward, so as to create a jet vacuum effect to suck the drilling fluid out of the drilling bit together with cuttings produced by the drilling bit upward.

In implementation, the vacuum-assisted aerated drilling system further comprises a separator. The separator is used to receive the sucked drilling fluid together with the cuttings and separate the cuttings from the drilling fluid. In one embodiment, the vacuum-assisted aerated drilling system further comprises a curved, spiral, or straight separation pipe, wherein the drilling fluid together with the cuttings are drawn into the separator through the curved or straight connecting pipe.

In implementation, the vacuum-assisted aerated drilling system further comprises a plurality of separators. The plurality of separators is used to receive the sucked drilling fluid together with the cuttings and separate the cuttings from the drilling fluid. Moreover, the plurality of separators is placed at different distances from the second air compressor, so as to collect the cuttings according to their weights and particle sizes.

DETAILED DESCRIPTION OF THE PREFERRED EMBODIMENT

The present invention is related to a vacuum-assisted aerated drilling system comprising a casing, a pump, and at least one air compressor. The casing is used for housing the borehole. The pump is used for pumping a drilling fluid into a drilling string and out of a drilling bit near a bottom of the borehole. The at least one air compressor is used for creating a jet vacuum effect to suck the drilling fluid pumped out of the drilling bit near the bottom of the borehole from a head of the borehole. The jet vacuum effect is not only helpful to reduce the need of the compressor power, but it also could accelerate the circulation rate of the drilling fluid.

Figure 1:
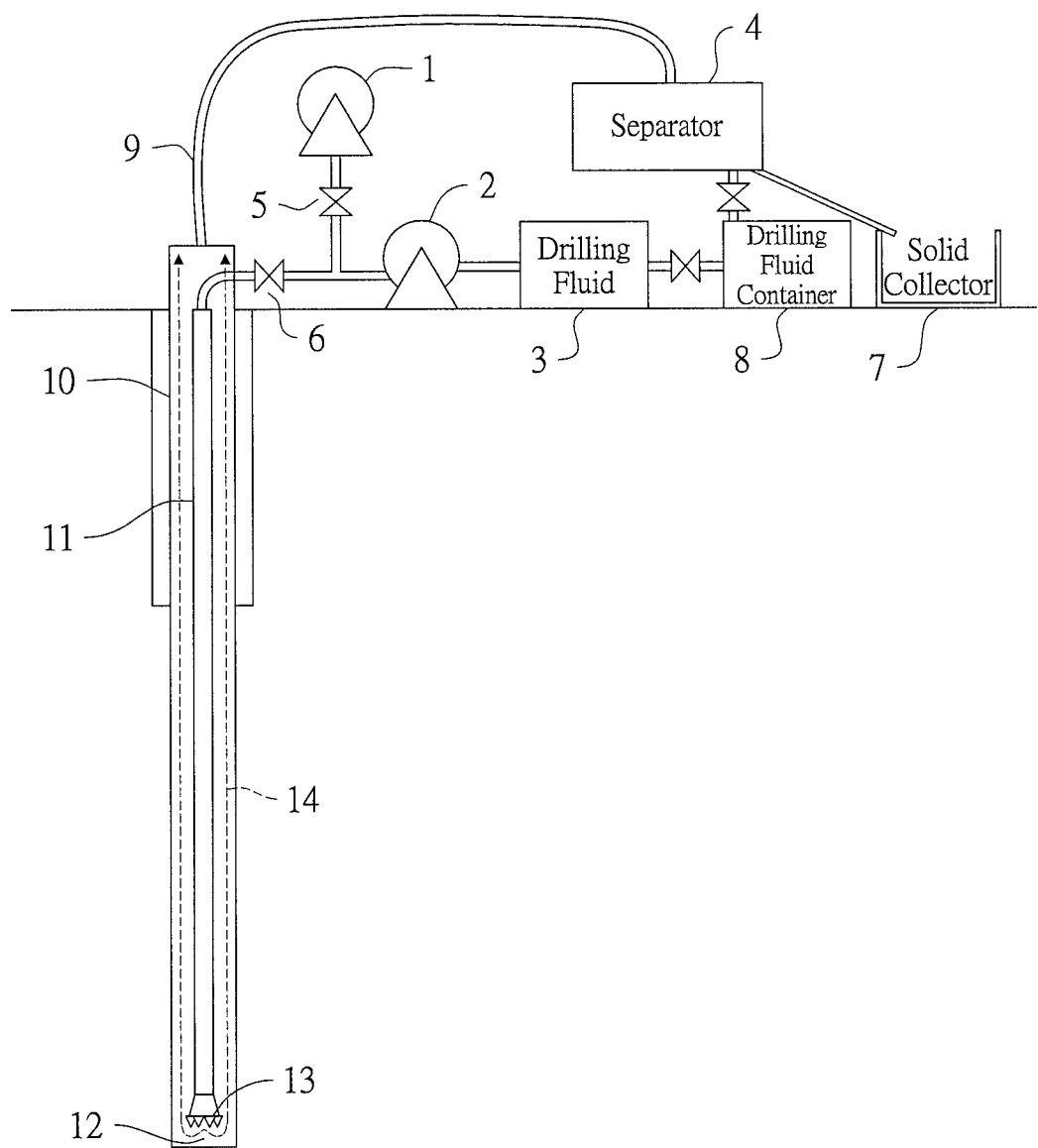
FIG. 1 shows a general configuration for aerated drilling.

Please refer to FIG. 1, which shows a general configuration for aerated drilling. The drilling fluid 3 is pumped by a pump 2 into a drilling string 11 and then circulated back to the surface from the bottom of a borehole 12 together with cuttings produced by a drilling bit 13. The drilling fluid together with cuttings will be drawn into a separator 4 via a returning pipe 9 so as to separate the cuttings from the drilling fluid. The cuttings are drawn into a solid collector 7 while the drilling fluid is drawn into a drilling fluid container 8. According to the characteristic of formation penetrating, air is injected by an air compressor 1 to a fluid passage and mixed with the drilling fluid 3 to create an aerated fluid of different specific weights so as to create different borehole 10 pressures. Valves 5, 6 are used respectively to control the flow of air and fluid. A high speed of circulation is required and applied to prevent the loss of circulation and the caving of the borehole so as to preserve the possible reservoirs.

Figure 2:
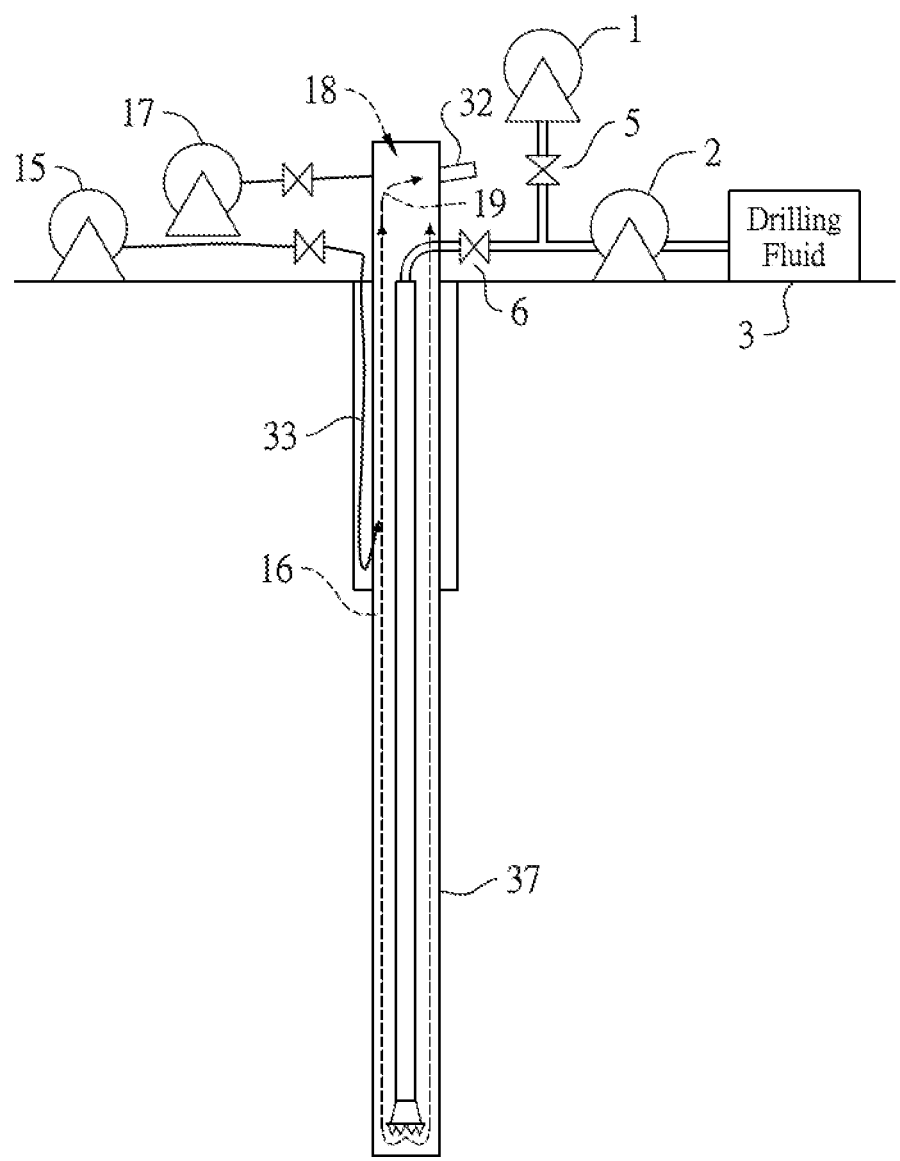
FIG. 2 shows a fluid circulation system having a jet vacuum.

Please refer to FIG. 2, which shows a preferred embodiment according to the present invention. The vacuum-assisted aerated drilling system comprises a pump 2, an air compressor 1, and a first and a second air compressors 15, 17. The pump 2 is used to pump a drilling fluid 3 into a drilling string 11. The air compressor 1 is used to inject air into a fluid passage in which the drilling fluid 3 flows. Valves 5, 6 are used respectively to control the flow of air and fluid. The first air compressor 17 is used to eject the air into a circulation outlet pipe 32 which is laid horizontally or slightly tilted upward. The ejection creates another jet vacuum 18 effect for sucking the returning drilling fluid 19 into the pipe outlet. The second air compressor 15 is used to push a high pressured air through a passage 33 that is extended firstly downward along the casing 37 and then reverted in 180 degrees upward, so as to create a jet vacuum 16 effect for sucking a drilling fluid upward.

In another embodiment, the vacuum-assisted aerated drilling system further comprises at least one separator and at least one separation pipe. The at least one separator is used to receive the sucked drilling fluid together with the cuttings and separate the cuttings from the drilling fluid. The separation pipe is curved, spiral or straight in shape. The drilling fluid together with the cuttings are drawn into the separator through the curved or straight connecting pipe by means of jet vacuums created by the first air compressor 17 and/or the second air compressor 15.

Figure 3:
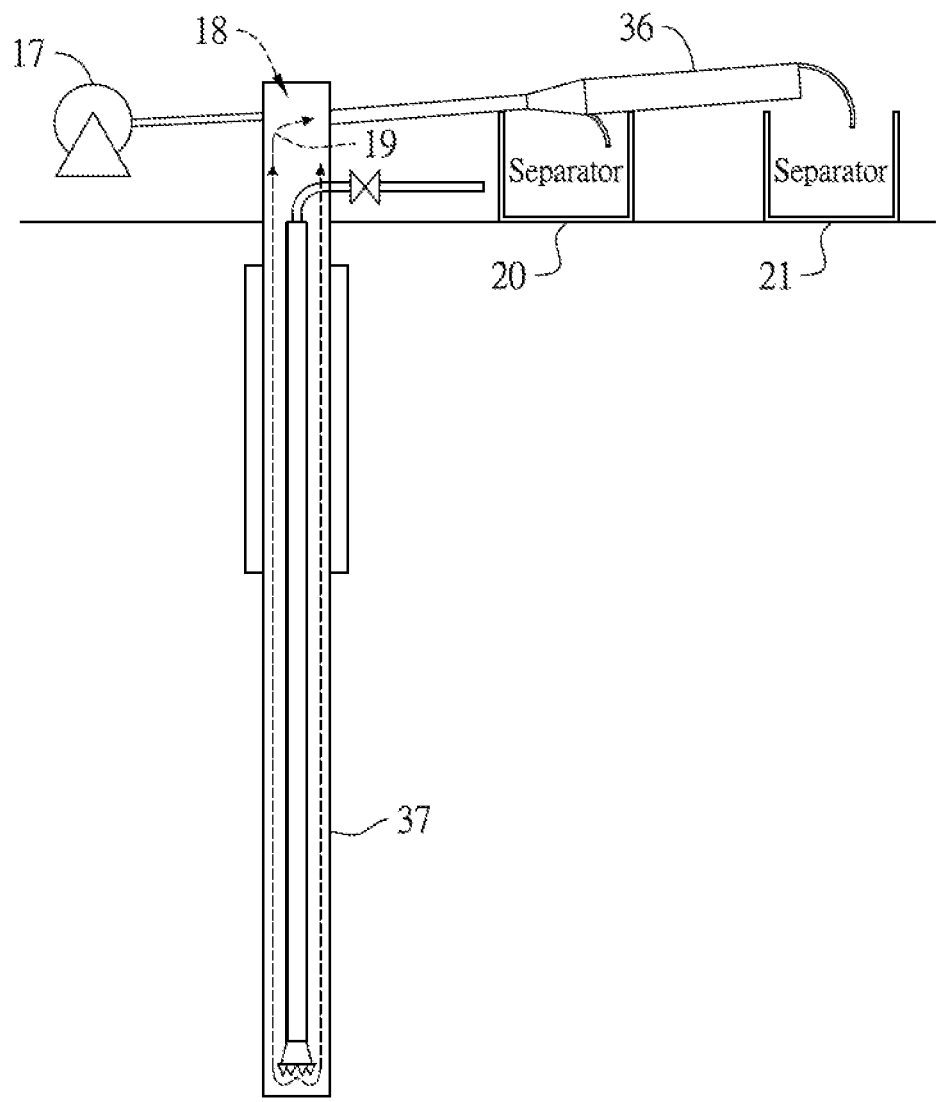
FIG. 3 shows a drilling fluid separator using a jet vacuum on the surface.

Please refer to FIG. 3, which shows another preferred embodiment according to the present invention, where the vacuum-assisted aerated drilling system further comprises two separators 20, 21 and two separation pipes 36. The jet vacuum 18 created by the first air compressor 17 on the surface to eject the returning drilling fluid to a curved, spiral, or straight pipe 36 with separators 20, 21 located at different distances from the ejector for collecting the cuttings according to the weight of cuttings and particle sizes.

Figure 4:
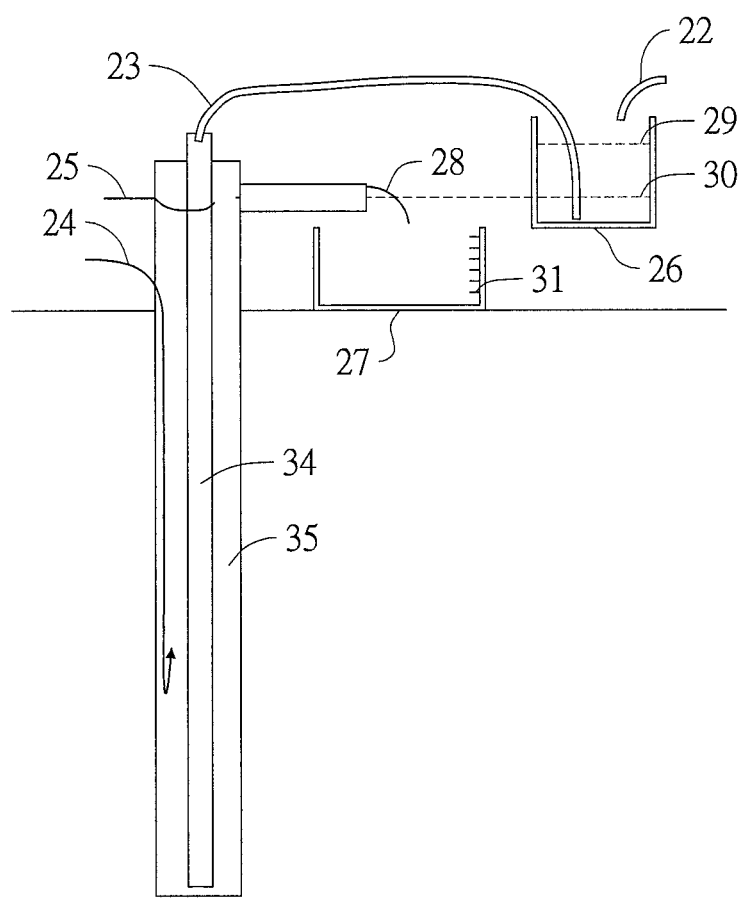
FIG. 4 show a small scale laboratory configuration which demonstrates the fluid circulation accelerated by the use of a jet vacuum.

Please refer to FIG. 4, which shows an experimental configuration for proving the acceleration of the fluid circulation by jet vacuums. The water flow rate is measured by a meter 31 provided at a water outlet 28 to a water tank 27. The water injected to the water tank 26 is adjusted by a water injector 22 to keep the In-water level 29 at a fixed location so that the pressure along the inner tube 34 and the outer tube is balanced. The flow rate is created at a rate proportional to the air injection rate from the borehole air jet inlet 24 and surface air jet inlet 25.

Although the embodiments of the present invention have been described in details, many modification and variations may be made by those skilled in the art from the teachings disclosed hereinabove. Therefore, it should be understood that any modification and variation equivalent to the spirit of the present invention be regarded to fall within the scope defined by the appended claims:

What is claimed is:

1. A vacuum-assisted aerated drilling system, comprising: a casing, used for housing the borehole; a pump, used for pumping a drilling fluid into a drilling string and out of a drilling bit near a bottom of the borehole; at least one air compressor, used for creating a jet vacuum effect along the middle of drilling-fluid pathway to suck the drilling fluid pumped out of the drilling bit near the bottom of the borehole from a head of the borehole: and a circulation outlet pipe, wherein the circulation outlet pipe is placed horizontally or tilted upward at the head of the borehole, wherein the at least one air compressor includes a first air compressor, used for ejecting air into the circulation outlet pipe, so as to create a jet vacuum effect to suck the drilling fluid out of the drilling bit together with cuttings produced by the drilling bit into the circulation outlet pipe.

2. The vacuum-assisted aerated drilling system as claimed in claim 1, further comprising a separator, wherein the separator is used to receive the sucked drilling fluid together with the cuttings and separate the cuttings from the drilling fluid.

3. The vacuum-assisted aerated drilling system as claimed in claim 2, further comprising a curved, spiral or straight separation pipe, wherein the drilling fluid together with the cuttings are drawn into the separator through the curved, spiral or straight separation pipe.

4. The vacuum-assisted aerated drilling system as claimed in claim further comprising a plurality of separators, wherein the plurality of separators is used to receive the sucked drilling fluid together with the cuttings and separate the cuttings from the drilling fluid; and the plurality of separators is placed at different distances from the first air compressor, so as to collect the cuttings according to their weights and particle sizes.

5. A vacuum assisted aerated drilling system, comprising:
a casing, used for housing the borehole;
a pump, used for pumping a drilling fluid into a drilling string and out of a drilling bit near a bottom of the borehole; and
at least one air compressor, used for creating a jet vacuum effect along the middle of drilling-fluid pathway and/or at earth surface to suck the drilling fluid pumped out of the drilling bit near the bottom of the borehole from a head of the borehole,
wherein the at least one air compressor includes a second air compressor, used for pushing a high pressured air into a passage that is extended firstly downward along the casing and then reverted in 180 degrees upward, so as to create a jet vacuum effect to suck the drilling fluid out of the drilling bit together with cuttings produced by the drilling bit upward.

6. The vacuum-assisted aerated drilling system as claimed in claim 5, further comprising a separator, wherein the separator is used to receive the sucked drilling fluid together with the cuttings and separate the cuttings from the drilling fluid.

7. The vacuum-assisted aerated drilling system as claimed in claim 6, further comprising a curved, spiral, or straight separation pipe, wherein the drilling fluid together with the cuttings are drawn into the separator through the curved or straight connecting pipe.

8. The vacuum-assisted aerated drilling system as claimed in claim 5, further comprising a plurality of separators, wherein the plurality of separators is used to receive the sucked drilling fluid together with the cuttings and separate the cuttings from the drilling fluid; and the plurality of separators is placed at different distances from the second air compressor, so as to collect the cuttings according to their weights and particle sizes.

* * * * *